Aug. 5, 1958  A. R. CRAWFORD  2,845,767
COTTON PICKING SPINDLE MOISTENING ASSEMBLY
Filed March 7, 1956
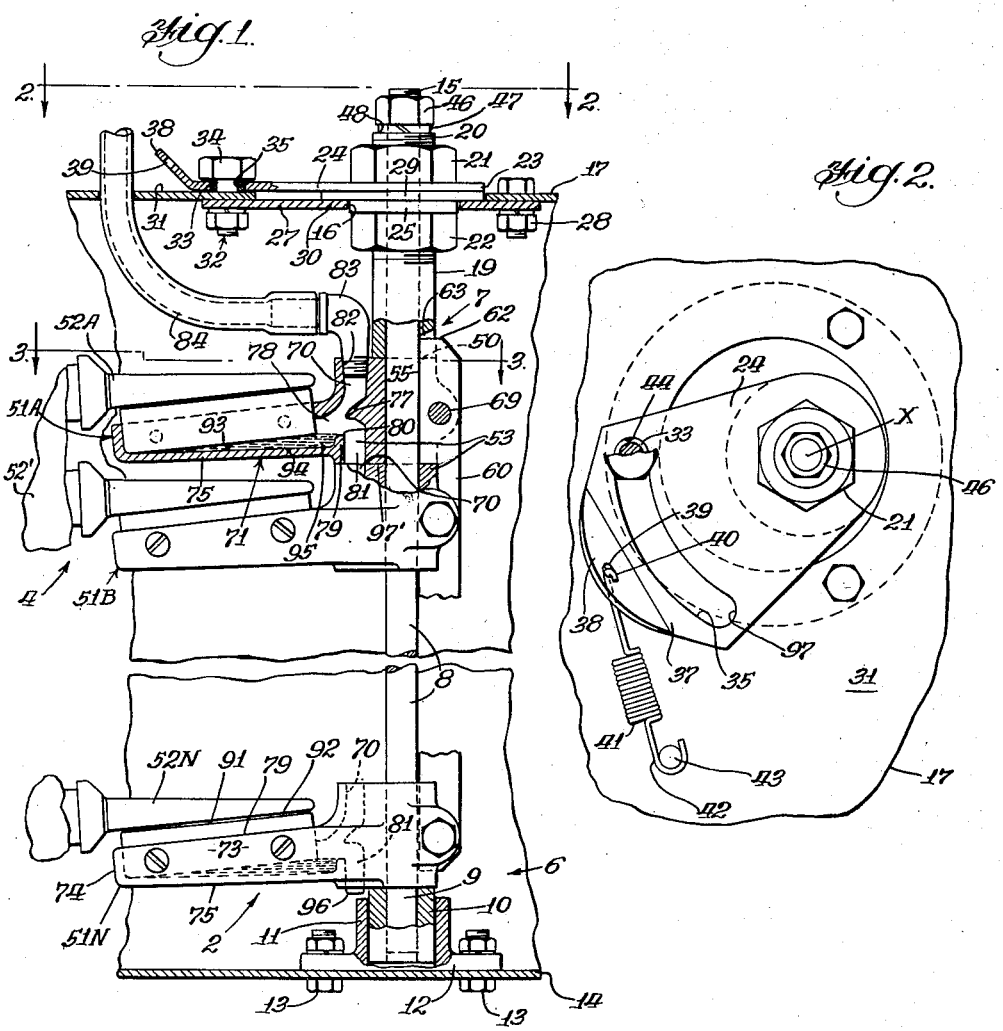
INVENTOR.
Arthur R. Crawford
BY Paul O. Pippel
Atty.

United States Patent Office 2,845,767
Patented Aug. 5, 1958

2,845,767

COTTON PICKING SPINDLE MOISTENING ASSEMBLY

Arthur R. Crawford, Memphis, Tenn., assignor to International Harvester Company, a corporation of New Jersey Application March 7, 1956, Serial No. 570,014

12 Claims. (Cl. 56—41)

This invention relates to cotton pickers and more specifically to a moistener system for the picking spindles of apparatus of the type described in U. S. Patent 2,140,631.

A general object of the invention is to provide a novel, simple and effective moistening system for the cotton picking spindles which provides positive moistening of each spindle.

A further object of the invention is to provide such a spindle moistener which is adapted to yield when obstructions occur between the spindles and the moistener.

A still further object of the invention is to provide a novel moistener pad in the form of a felt wick which is made up of a plurality of batts of fibrous material which are laminated with intervening rubber strips or adhesive material for strength and to simplify manufacture.

The invention contemplates the provision of an assembly incorporating a series of vertically stacked trough-like containers and each container supporting a moistener pad which projects upwardly therefrom and the container and pad being so arranged that the entire bottom end or side of the moistener pad is continually immersed in the moistening liquid, which is preferably water, in order to obtain effective capillary action to soak the entire pad.

A still further object of the invention is to provide a novel system for forcing the liquid into the moistener pads not only through hydrostatic pressure but also through centrifugal swinging action which is developed by the moistener stand being spring loaded so that when it is swung away from the spindles by obstructions between the spindles and the moistener stand, the moistener stand is adapted to swing back and thus throw the water outwardly into the pads.

A still further object of the invention is to provide such a moistener system which incorporates a moistener stand which is swingable about a generally upright axis whereby the stand is constantly being caused to swing back and forth and thereby agitate the fluid and thus clear any obstructions in the passages.

These and other objects of the invention will become more apparent from the specification and drawings, wherein:

Figure 1 is a fragmentary side elevational view with parts broken away and shown in section of a moistener assembly shown in association with the picker spindles and the housing;

Figure 2 is a fragmentary plan view taken substantially on the line 2—2 of Figure 1; and Figure 3 is a horizontal sectional view taken substantially on the line 3—3 of Figure 1 with portions broken away and shown in section.

Describing the invention in detail, the moistener assembly or stand generally designated 2 is adapted for cooperation with the cotton-picker spindle assembly designated 4 which may be of the type shown and more specifically explained in U. S. Patent 2,140,631.

The assembly or carrier 2 is mounted with a picker housing 6 and comprises a support stand or carrier 7 which includes an upright shaft which at its lower end 9 is threaded or preferably pressed into a bearing 10 which fits within the bushing 11 which is formed integral with a base plate mounting portion 12 and suitably fastened as by bolts 13 to the bottom wall 14 of the housing 6.

The upper end 15 of the shaft 8 extends through an opening 16 in the upper plate 17 or wall of the housing and has sleeved thereon a sleeve or tube 19 which is externally threaded at 20 and upon which are threaded a pair of opposing nuts 21 and 22 which embrace one end 23 of an arm 24 therebetween and interlock the same with the member 19. The lower nut member 22 is preferably provided with a shoulder or annulus 25 which fits within the complementary opening 16 and is coaxial with the bottom bearing 11, whereby the entire assembly 7 is rotatable about a vertical axis. In the present instance, opening 16 is shown in a covering plate 27 which is secured to the plate 17 by bolts 28 and there being provided between the arm 24 and the shoulder 25 a washer 29 which sits on top of the plate 27 as at 30 and provides a spacer for the arm 24 which overlies the top side 31 of the wall 17. The cover plate 27 is also secured to the wall 17 by a bolt generally designated 32 which has a spacer 33 interposed between its head 34 and the top side 31 of the wall 17, said spacer with the bolt 32 extending through an arcuate slot 35 in the outer extremity of the arm 24, said slot 35 being generally concentric with the axis X (Fig. 2) of the shaft of the moistener stand 7.

It will be seen in Figures 1 and 2 that the outer extremity 37 of the arm 24 is provided with an upturned end portion 38 which has an eye 39 to which one end 40 of a tension spring 41 is hooked, the other end 42 of the spring being hooked about an upstanding post 43 on the top wall 17 of the housing. The spring 41 thus tends to bias the carrier in the direction of closure of the spring and this is limited by engagement of the spacer 33 with the end surface 44 of the slot 35.

The member 19 is interlocked with the shaft 8 by means of a nut 46 threaded upon the upper end 15 of the shaft 8 and abutting through a lock washer 47 against the upper edge 48 of the sleeve 19 which has its lower end abutting as at 50 against the upper side of the moistener structure generally designated at 51A. It will be understood that in present day cotton pickers there are provided, as will be understood by those skilled in the art, fourteen or twenty spindles 52 on each bar 52' disposed in a vertical series and there is provided one moistener for each elevation of spindles and that the level of spindles designated 52A cooperate with the moistener designated 51A which is at the uppermost end of the series. For purposes of clarity and due to the fact that each of the moisteners and spindles are identical except for their elevation, these will be identified by the same reference numeral except for the designation of a suffix A, B, etc., depending on the elevation of the spindle and the moistener. Thus the top uppermost layer of spindles will be designated 52A and the associated moistener or distributor assembly 51A and the lowermost 51N and 52N in a fourteen spindle high unit.

Each moistener has an end portion 53 which comprises a split collar 54 providing a vertical opening 55 receiving the cylindrical shaft 8 therethrough, the collar having outwardly extending ears 56 and 57 which define a gap or opening 58 therebetween, the gap receiving a combination aligning and positioning bar 60 which has an upper end 62 (Fig. 1) extending into a slot 63 and interlocks the portion 19 of the arm assembly with the distributors. Each pair of ears 56 and 57 are interconnected by a bolt 65 which extends through aligned apertures 66 and 67 and threads into the opening 67. Each bolt 65 has its shank passing through an aperture 69 in the bar 60.

The end portion 53 of each distributor comprises an inlet opening 70 which leads into the upper part of a container portion generally designated 71 which includes side walls 72, 73 and 74 and a bottom wall 75 integrally united with each other and with the portion 53. An outlet 81 is provided in portion 53 in vertical alignment with and shielded by the projection 77 of the lower end of inlet 70 whereby the fluid is caused to run into the container 71 and after it fills the container a predetermined depth, which is approximately half full, then the water spills over the dam 80 into the outlet 81 and into the inlet 70 of the container next below. The inlet 70 of the uppermost distributor 51A is threaded to an elbow which is connected to a flexible conduit which may be in the form of a rubber hose, the conduit connecting to a reservoir in the manner shown in U. S. Patent 2,711,066.

Each container receives a pad 85 which is of rectangular form, and the pad being formed of capillary material which is herein shown as a plurality of batts of fibrous material such as cotton or wool, the batts being laminated together by adhesive strips of material such as rubber or plastic pliable material 86 to form generally rectangular blocks. It will be understood that these blocks are actually sheared from a continuous strip of material. It will be seen that the upper portion of the pad projects above the upper end of the container for sweeping contact of the associated spindle and the pad is secured at opposite sides to the side walls 72 and 73 of the container by self-threading screws 87 which extend through apertures 88 in the side walls, shank portions 89 of the screws threading into the pad 85. It will be seen that each pad is inclined with respect to the bottom wall 75 of the container and presents an upper surface 91 for parallel engagement with the lower edge 92 of the conical periphery of the associated conical spindle. Inasmuch as the top surface 91 and the bottom surface 93 of the pad are generally parallel and the bottom wall 75 of the container is generally horizontal, there is developed between the bottom side of each pad and the bottom wall of the related container an outwardly narrowing space which extends the full length and width of the pad whereby the fluid 95 which is introduced into each container through the conduit 84 and the inlet 70 inundates the entire bottom side of the pad for efficient capilliary action therethrough.

The distributors are disposed in face to face contact at 97' except for the uppermost and lowest container as will be seen in the drawings.

*Operation of the device*

The fluid 95 is introduced into the conduit 84 which flows through the elbow 83 into the inlet 70 of the uppermost container 51A and fills the space 94 therein and the fluid overflows the dam 80 and runs through the outlet 81 into the inlet 70 of the container 51B immediately therebelow which after it is filled allows the fluid to flow out of its outlet and down the line until the fluid runs into the inlet 70 of the lowermost container which in the present instance is designated 51N and fills the same and is prevented from running out of its outlet 81 by a plug 96 which is threaded into the outlet 81 of the lowermost container. The pads which are wick-like will absorb the water and bring it to the upper surfaces 91 thereof whereby the spindles of the related layer sweep thereover and gather the moisture on the periphery thereof. In the event that some spindle should carry an excessive amount of twigs, branches or some other material such as an excessive wad of cotton which hasn't stripped, then the spindles which are moving with the associated drum in the direction indicated by the arrow in Figure 3 cause the moistener stand 7 to swing in the direction of the arrow shown in Figure 3, the extent of such movement being limited by abutment of the end surface 97 (Fig. 2) of the slot 35 of the ear 24 with the abutment 33. After the obstruction is clear for the passage of the spindle or otherwise, the spring 41 which has been expanded will sharply pull or swing the stand back to its initial position whereby the fluid in the pockets 94 of the containers is centrifugally urged outwardly in the direction of the pads thereby supplementing the capillary action.

Thus from the foregoing description it will be readily understood that a yieldable mounting is provided for the moistener stand and an efficient and improved water or liquid distribution system is provided which not only inundates the entire bottom of each pad for efficient capillary action but which obtains a hydrostatic pressure as well as centrifugal action for forcing the water into the distribution pads. In addition, inasmuch as the pads are of rectangular shape they are very easily and cheaply manufactured and their simple securement in the containers facilitates their replacement.

The plug 96 may be eliminated so that the overflow of water will escape and hydrostatic pressure is eliminated and all of the pads are substantially uniformly saturated.

What is claimed is:

1. A cotton picker spindle moistening device comprising in combination, a support structure, an upright stand rotatably mounted from said structure, a vertical row of outwardly extending distributor elements for moistening liquid connected to the stand and disposed one above the other in vertically spaced relationship, a moistening pad mounted upon each element in liquid transferring relationship therefrom, and yieldable means interposed between said stand and said support for yieldably resisting rotation of said stand with said elements and returning the same to its initial position.

2. In a device of the class described, a cylindrical carrier shaft, a plurality of moistener liquid distributor elements stacked upon the shaft and each element having a split collar embracing the shaft and said collar having opposed portions defining a space therebetween, a substantially straight aligning member extending lengthwise axially of the shaft through said spaces between said portions of the collars of said elements, and a bolt extending through related portions of each collar and through said member.

3. A cotton picker spindle moistening device comprising in combination, an upright support, means rotatively mounting said support for horizontal swinging movement, a spindle moistener carried by the support, and yieldable means operatively associated with the support for accommodating swinging movement of said support with the moistener and returning the same to its initial position.

4. A device for moistening a rotary cotton picker spindle, comprising a support structure, a carrier rotatably mounted upon said structure for swinging movement on a generally vertical axis, a radially outwardly extending moistener liquid distributor element connected to said carrier for swinging movement therewith, a radially extending arm connected to said carrier, and spring means reactively stressed between opposing portions of said arm and said support structure for yieldably resisting swinging movement of said carrier and said distributor element.

5. A device for moistening a rotary cotton picking spindle comprising a container for receiving moistening liquid, a support means mounting said container from one end upon said support in a generally horizontal position, said container having a top opening, a liquid-permeable moistening pad mounted within the container for absorbing the liquid therein, said container having upstanding sides and a bottom, and said pad having a bottom side spaced vertically from said bottom of the container from end to end thereof and providing therewith a liquid receiving space substantially coextensive with said bottom side of said pad, and means operatively connected to said space for providing fluid thereto.

6. A moistener assembly for a conical cotton picker spindle, an elongated moistener fluid container having a bottom and upright sides defining a top opening, a moistener pad fitted into said opening and having top and bottom sides, said pad disposed with its top side inclined to the major axis of said container for parallel face engagement with a conical spindle, and said bottom side of said pad and bottom of said container defining a liquid receiving space therebetween for inundating the entire bottom side of said pad in liquid adapted to be delivered to the container through an opening in one side of said container.

7. A moistener for a cotton picker comprising a support, a moistener distributor stand pivotally connected to the support for horizontal swinging movement, an arm connected to the stand, a spring connected to said arm and to the support for urging the stand in one direction, and engageable abutment means on the arm and said support for limiting movement of said stand in said one direction.

8. A moistener for a cotton picker comprising a support, a moistener distributor stand including an upright element pivotally mounting the stand from the support for generally horizontal swinging movement about an upright axis, a radial arm connected to said element and having a slot of limited extent concentric with said axis and terminating in opposite ends and means on the support extending through said slot and abuttable with said ends of the slot for limiting swinging movement of the stand.

9. A moistener for a cotton picker comprising a stand including an upright cylindrical shaft, a plurality of distributor elements having end portions sleeved onto said shaft in axially stacked relation thereon, said elements having openings in said end portions axially alignable, an aligning bar extending through said axially aligned openings in said end portions for aligning said elements axially of the shaft, means fixedly connecting at least one of said elements to the shaft against rotation relative thereto, an arm assembly including a sleeve fitted onto said shaft and having an opening therein receiving said aligning bar therein, and a radial arm connected to said sleeve for swinging with said stand about the axis of said shaft.

10. A moistener device comprising a support, a distributor assembly comprising an upright element pivotally mounted thereon for swinging movement on an upright axis, a vertical row of horizontally positioned containers for moistening liquid connected to the support one above the other in vertically spaced relation, each container having a fluid inlet and a fluid outlet, the inlet of each container communicating with the outlet of the one thereabove, conduit means connecting the inlet of the uppermost container for connection to an associated source of fluid, and means including spring means operatively associated with said element for positioning said assembly and limiting pivotal movement thereof.

11. In a cotton picker having mechanism of the type including a plurality of uniformly vertically spaced layers of picker spindles, the improvement residing in a fluid distributor for the spindles comprising: a vertical series of individual distributor elements equal in number to the spindle layers and respectively having upper and lower faces and having vertically alignable openings, and means securing said elements together in face-to-face contact except for the upper face of the top element and the lower face of the bottom element, and means for vertically aligning said elements comprising a single upright member extending through said alignable openings in said elements.

12. In a cotton picker having mechanism of the type including a plurality of uniformly vertically spaced layers of picker spindles, the improvement residing in a fluid distributor for the spindles comprising: a vertical series of individual distributor elements equal in number to the spindle layers and respectively having upper and lower faces, and means securing said elements together in face-to-face contact except for the upper face of the top element and the lower face of the bottom element, and each element having a generally horizontally extending portion in the form of a container having upstanding sides and a bottom, and a pad of capillary type in each container having a bottom portion in the container spaced from the bottom thereof and having an upper portion projecting upwardly from the container and the bottom portion of each pad spaced throughout its entire area upwardly from the bottom of the related container and providing a fluid space therewith whereby the entire bottom portion of the pad is adapted to be immersed in fluid in the container, and means connected to each container for supplying fluid to said space therein.

References Cited in the file of this patent

UNITED STATES PATENTS

| | | |
|---|---|---|
| 2,369,708 | Baker et al. | Feb. 20, 1945 |
| 2,433,083 | Baker et al. | Dec. 23, 1947 |
| 2,711,066 | Barbknecht | June 21, 1955 |